(12) United States Patent
Zou et al.

(10) Patent No.: US 12,479,150 B2
(45) Date of Patent: *Nov. 25, 2025

(54) BOTTLE BLOWING MOLD, BOTTLE BLOWING MACHINE AND PLASTIC BOTTLE

(71) Applicant: GUANGZHOU TECH-LONG PACKAGING MACHINERY CO., LTD, Guangdong (CN)

(72) Inventors: Daqun Zou, Guangdong (CN); Xiaolin Huang, Guangdong (CN)

(73) Assignee: GUANGZHOU TECH-LONG PACKAGING MACHINERY CO., LTD, Guangdong (CN)

( * ) Notice: Subject to any disclaimer, the term of this patent is extended or adjusted under 35 U.S.C. 154(b) by 113 days.

This patent is subject to a terminal disclaimer.

(21) Appl. No.: 18/020,576

(22) PCT Filed: Sep. 29, 2020

(86) PCT No.: PCT/CN2020/118767
§ 371 (c)(1),
(2) Date: Feb. 9, 2023

(87) PCT Pub. No.: WO2022/056959
PCT Pub. Date: Mar. 24, 2022

(65) Prior Publication Data
US 2023/0302712 A1    Sep. 28, 2023

(30) Foreign Application Priority Data

Sep. 17, 2020   (CN) .......................... 202010981810.5
Sep. 17, 2020   (CN) .......................... 202022047986.1

(51) Int. Cl.
*B29C 49/48*    (2006.01)
*B29K 67/00*    (2006.01)
*B29L 31/00*    (2006.01)

(52) U.S. Cl.
CPC ............ *B29C 49/482* (2013.01); *B29C 49/48* (2013.01); *B29C 2049/4879* (2013.01);
(Continued)

(58) Field of Classification Search
CPC .............................. B29C 49/482; B29C 49/48
See application file for complete search history.

(56) References Cited

U.S. PATENT DOCUMENTS 6,338,415 B1    1/2002   Grob
6,789,689 B1    9/2004   Beale
(Continued)

FOREIGN PATENT DOCUMENTS

CN         1452544 A  *  10/2003  ............. B29C 49/18
CN         1636702 A     7/2005
(Continued)

OTHER PUBLICATIONS

Machine translation JP2004122736A (Year: 2004).*
(Continued)

*Primary Examiner* — Jacob T Minskey
*Assistant Examiner* — Wayne K. Swier
(74) *Attorney, Agent, or Firm* — Troutman Pepper Locke LLP; Scott D. Wofsy

(57) ABSTRACT

Provided are a bottle blowing mold, a bottle blowing machine and a plastic bottle, the bottle blowing mold includes a mold cavity, where a bottle body, a bottle shoulder, a handle and a bottle neck are formed within the mold cavity after a bottle preform is blown, the bottle shoulder is located between the bottle body and the bottle neck, one end of the handle is connected to the bottle shoulder, an other end of the handle is connected to the bottle shoulder or the bottle neck, and a cavity wall of the mold cavity is provided with at least one first rib to have a non-closed or annularly closed first groove is formed on the bottle body.

7 Claims, 20 Drawing Sheets

(52) U.S. Cl.
CPC ............... *B29C 2949/0791* (2022.05); *B29K 2067/003* (2013.01); *B29L 2031/7158* (2013.01)

(56) References Cited

U.S. PATENT DOCUMENTS

| | | |
|---|---|---|
| 8,261,932 B2 | 9/2012 | Miura |
| 2002/0171161 A1 | 11/2002 | Belcher |
| 2005/0048237 A1 | 3/2005 | Kim |

FOREIGN PATENT DOCUMENTS

| | | | | |
|---|---|---|---|---|
| CN | 1886300 A | | 12/2006 | |
| CN | 205255490 U | | 5/2016 | |
| CN | 112060548 A | | 12/2020 | |
| CN | 212603333 U | | 2/2021 | |
| FR | 2917328 A1 | * | 12/2008 | ........... B29C 49/482 |
| JP | H 04 083629 A | | 3/1992 | |
| JP | H07314540 A | * | 12/1995 | ............ B29C 49/20 |
| JP | 2931996 B2 | | 8/1999 | |
| JP | 2004122736 A | * | 4/2004 | |
| JP | 2005067188 A | | 3/2005 | |
| JP | 3948663 B2 | | 7/2007 | |
| JP | 2013-508230 A | | 3/2013 | |
| JP | 2023 504058 A | | 2/2023 | |
| JP | 2023 540167 A | | 9/2023 | |
| WO | 9501859 A1 | | 1/1995 | |
| WO | 0026001 A1 | | 5/2000 | |

OTHER PUBLICATIONS

Machine translation FR2917328A1 (Year: 2008).*
Machine translation JPH07314540A (Year: 1995).*
Machine translation CN1452544A (Year: 2003).*
Machine translation JP2013508230A (Year: 2013).*
International Search Report issued in PCT/CN2020/118767 dated Jun. 18, 2021.
Partial European Search Report dated Aug. 20, 2024, issued during the prosecution of European Patent Application No. EP 20953817.2.
Japanese Office Action dated Jan. 25, 2024, issued during the prosecution of Japanese Patent Application No. JP 2023-504055.
European Search Report of Nov. 29, 2024, issued during the prosecution of EP 20953817.2.
Chinese 1st Search Report of Sep. 17, 2020, issued during the prosecution of CN 2020109818105.
Chinese Office Action of Oct. 30, 2024, issued during the prosecution of CN 202010981810.5.
Office Action issued in Japanese Patent Application No. JP 2023-504055, mailed Aug. 26, 2025, with English translation.

* cited by examiner

BOTTLE BLOWING MOLD, BOTTLE BLOWING MACHINE AND PLASTIC BOTTLE

CROSS-REFERENCE TO RELATED APPLICATIONS

This is a National Stage Application filed under 35 U.S.C. 371 based on International Patent Application No. PCT/CN2020/118767, filed on Sep. 29, 2020, which claims priority to Chinese Patent Application No. 202010981810.5 filed on Sep. 17, 2020 and claims priority to Chinese Patent Application No. 202022047986.1 filed on Sep. 17, 2020, disclosures of all of which are incorporated herein by reference in their entireties.

TECHNICAL FIELD

The present application relates to the field of bottle blowing technologies, for example, a bottle blowing mold, a bottle blowing machine and a plastic bottle.

BACKGROUND

At present, plastic feeding bottles and beverage bottles with self-contained handles on the market are mainly divided into two types, one type is a bottle with a self-contained handle and made of High Density Polyethylene (HDPE) material, and the other type is a bottle with a rear handle and made of a polyethylene glycol terephthalate (PET) material. The bottle with the self-contained handle and made of the HDPE material has the defects that sealing is incomplete, a bottle body is easy to damage, and a volume of the bottle cannot be controlled; the other bottle made of the PET material has the advantages of being good in sealing performance, firm in bottle body, high in oxygen barrier performance, transparent, easy to observe and the like compared with the bottle made of the HDPE material, but at present, the bottle made of the PET material needs to be provided with the rear handle, and the handle in the bottle with the rear handle and made of the PET material needs to be produced and installed through a specific equipment and is prone to falling off after being installed. Due to the above reasons, related enterprises in the industry want to replace the bottle with its own handle and made of the PET material with the bottle with the rear handle and made of the PET material on the market at present.

In order to ensure that a position of the handle is not changed and the shape is complete, a preform at a handle part of a bottle preform may only be transversely stretched and cannot be longitudinally stretched. Therefore, a technical treatment needs to be performed on the handle part in a bottle preform heating process, and that in a bottle blowing process, the handle part softens after being too high in temperature and thus deforms, and further causes a bottle blowing failure is prevented. The bottle with the self-contained handle and made of the PET material is manufactured by using a two-step bottle blowing process method, that is, the bottle preform is firstly formed by injection molding, and then the bottle preform is blown into the bottle in a bottle blowing mold. Compared with a conventional bottle preform, the bottle preform with the self-contained handle has an additional assembly, i.e., the handle, so that problems which do not occur in a conventional bottle preform blowing process may be generated in a bottle preform blowing process. After the bottle preform is heated, a temperature of the handle part is low, a temperature of a bottle body part is high, so that a preform at the bottle body part is softer than the preform of the handle part, in a stretching and bottle blowing expanding process of the bottle preform, the preform at the bottle body part is expanded firstly and fills the bottle body part of the mold, and at this time, the handle part of the bottle preform is not attached to an inner wall of the mold. During a continuous blowing, the preform at the bottle body part pushes the handle part to the inner wall of the mold under the action of compressed air, and finally the preform at the bottle body part and the preform of the handle part are attached to the mold together under the action of the compressed air. After the bottle preform is blown, wrinkles are easily formed at a bottle shoulder opposite to the handle, and a lower end of the handle is easily moved upwards, so that the quality of the bottle is unqualified.

SUMMARY

The present application provides a bottle blowing mold and a bottle blowing machine.

The present application provides a plastic bottle.

An embodiment provides a bottle blowing mold. The bottle blowing mold comprises a mold cavity, where a bottle body, a bottle shoulder, a handle and a bottle neck are formed within the mold cavity after a bottle preform is blown, the bottle shoulder is located between the bottle body and the bottle neck, one end of the handle is connected to the bottle shoulder, and an other end of the handle is connected to the bottle shoulder or the bottle neck as well, cavity wall of the mold cavity is provided with at least one first rib to have a non-closed first groove or an annularly closed first groove formed on the bottle body.

As an alternative to the present application, the cavity wall is further provided with a second rib to have a second groove formed at a junction of the bottle shoulder and the bottle body.

As an alternative to the present application, the at least one first rib is disposed on a same plane, or the at least one first rib is disposed on the cavity wall in a wave shape.

As an alternative to the present application, a number of first ribs is not less than two, and the first ribs are disposed at intervals or partially connected.

As an alternative to the present application, the cavity wall is further provided with at least one third rib to have a third non-closed groove formed on the bottle shoulder.

As an alternative to the present application, the mold cavity includes a first concave region to have a raised step structure formed on the bottle neck.

As an alternative to the present application, the mold cavity includes a second concave region configured for accommodating the handle.

An embodiment provides a bottle blowing machine. The bottle blowing machine includes the bottle blowing mold of any one of the technical schemes described above.

An embodiment provides a plastic bottle. The plastic bottle is made by the bottle blowing machine described above.

As an alternative to the present application, the plastic bottle is made of PET.

According to the bottle blowing mold of the present application, the at least one first rib is disposed on the cavity wall of the mold cavity, the non-closed or annularly closed first groove is formed on the bottle body through the first rib, the first rib limits a preform at a bottle body part from moving towards the bottle shoulder and a handle part in a blowing process, wrinkles are prevented from being generated at the bottle shoulder, and deformation of the handle is avoided; and the blowing quality of the bottle preform is improved. The plastic bottle manufactured by using the bottle blowing mold of the present application is formed by blowing the bottle preform with a self-contained handle, and due to a fact that no handle needs to be independently assembled, the production process is simplified, the production efficiency is improved, the production cost is reduced, and a condition that the handle falls off is avoided.

Figure 1:
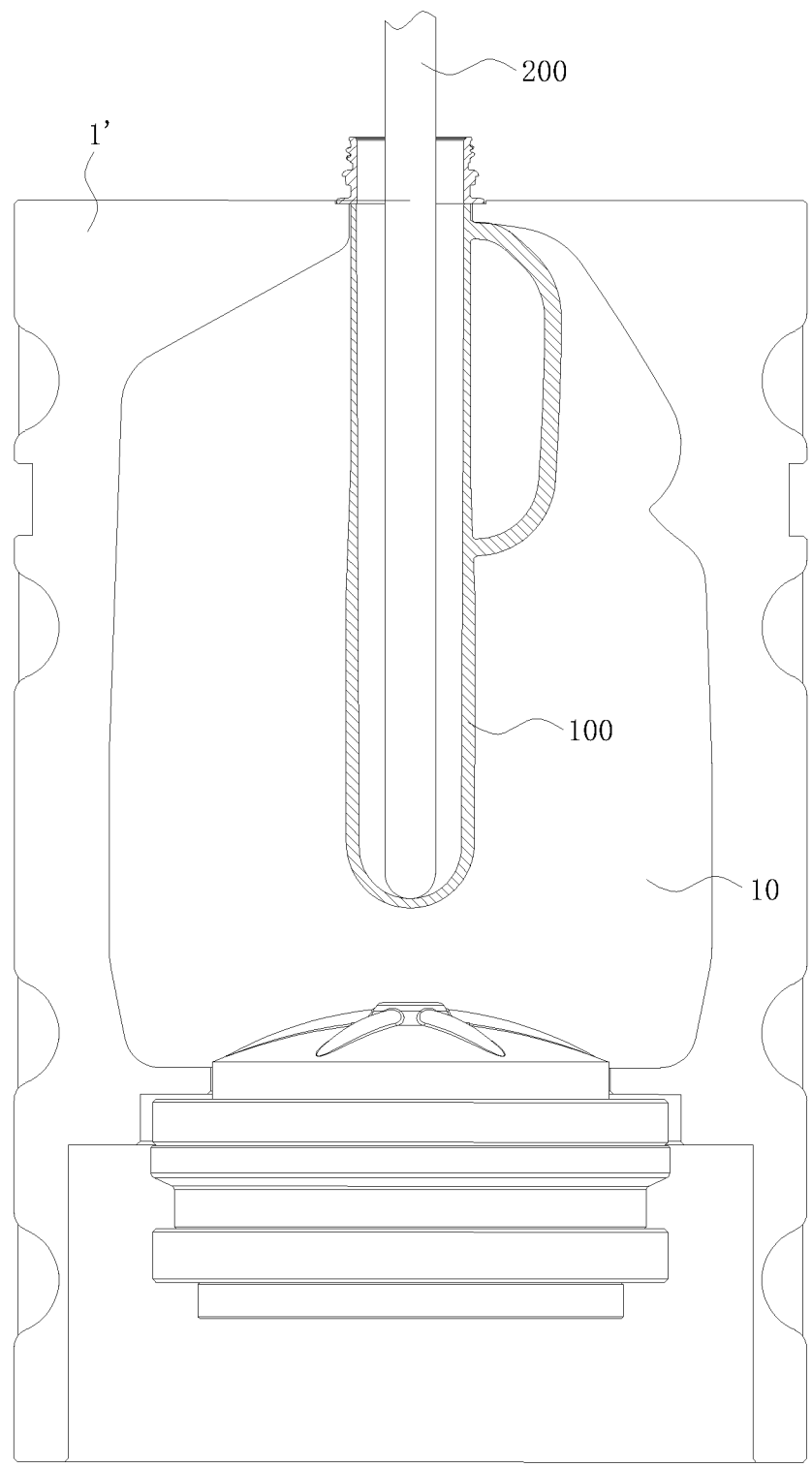
FIG. 1 is a schematic view before blowing a bottle preform with a self-contained handle by using a conventional mold.
Figure 2:
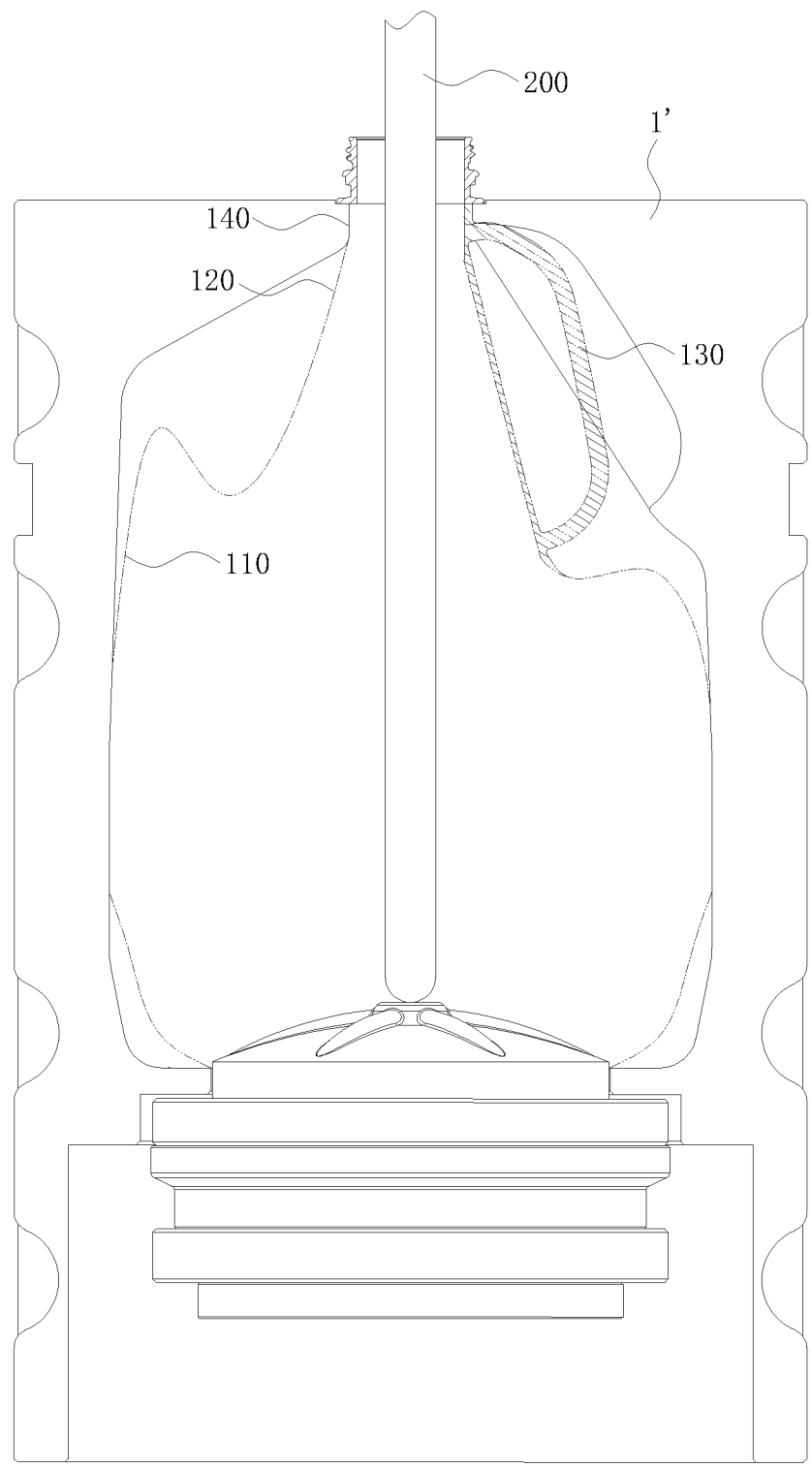
FIG. 2 is a schematic view when blowing a bottle preform with a self-contained handle by using a conventional mold.
Figure 3:
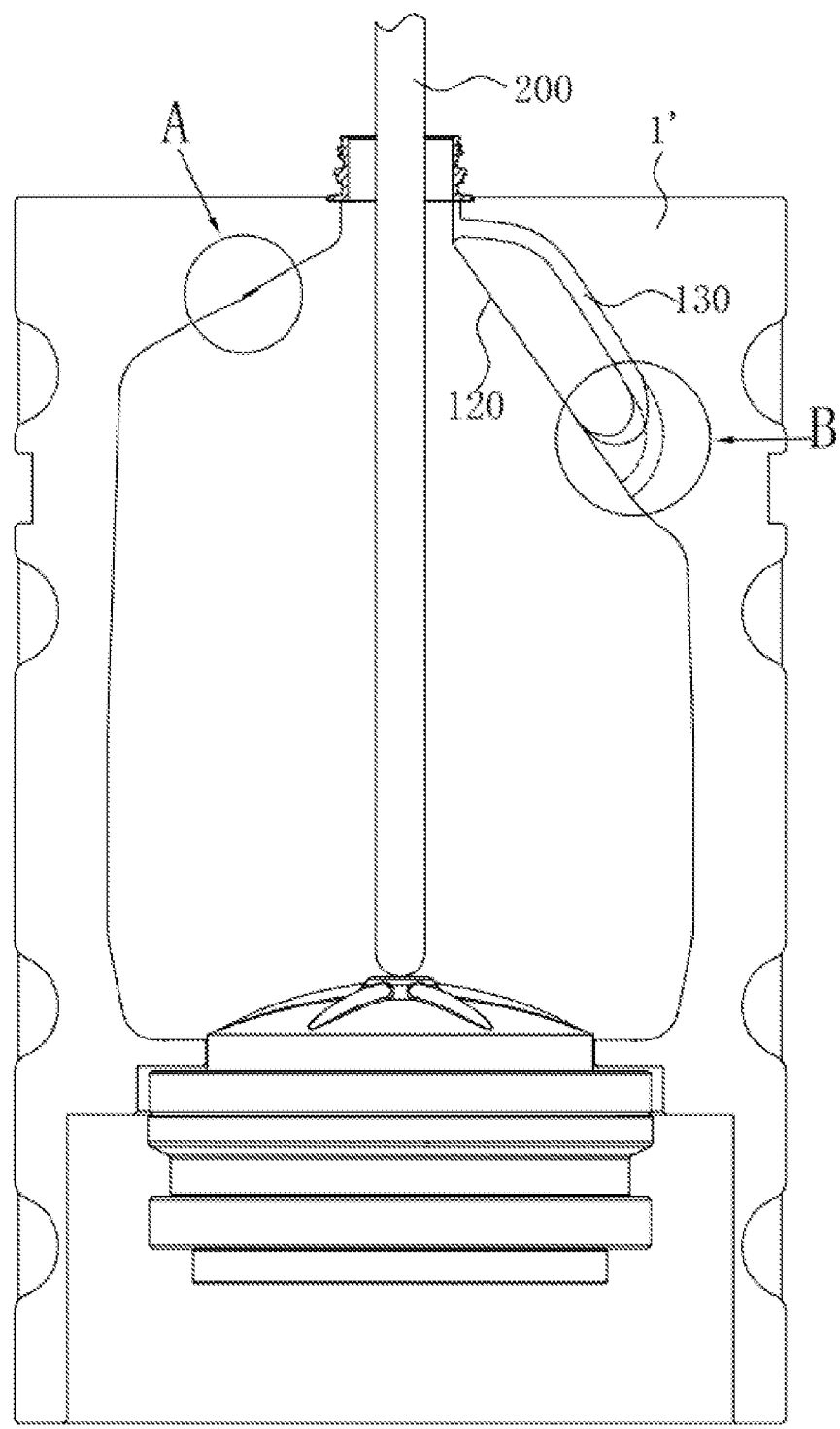
FIG. 3 is a schematic view after blowing a bottle preform with a self-contained handle by using a conventional mold.

In the drawings:
1', Conventional mold;
1, Bottle blowing mold;
10, Mold cavity;
11, Left half mold;
12, Right half mold;
13, Bottom mold;
101, First rib;
102, Second rib;
103, Third rib;
104, First concave region;
105, Second concave region;
100, Bottle preform;
100', Plastic bottle;
110, Bottle body;
120, Bottle shoulder;
1201, First wrinkle;
1202, Second wrinkle;
130, Handle;
140, Bottle neck;
200, Stretching rod;
1100, First groove;
1200, Second groove;
1300, Third groove;
1400, Step structure.

DETAILED DESCRIPTION

A technical scheme of the present application will be further described in conjunction with the drawings and specific embodiments below.

In the present application, unless expressly specified and limited otherwise, a first feature being "above" or "below" a second feature may include the first feature and the second feature being in direct contact, and may also include the first feature and the second feature not being in direct contact but being in contact through an additional feature between them. Moreover, the first feature being "above" the second feature includes the first feature being directly above and obliquely above the second feature, or simply represents that the first feature is at a higher level than the second feature. The first feature being "below" the second feature includes the first feature being directly below and obliquely below the second feature, or simply represents that the first feature is at a lower level than the second feature.

Moreover, the terms "first" and "second" are used for descriptive purposes only and are not to be construed as indicating or implying relative importance or as implicitly indicating a number of technical features indicated. Thus, features defined as "first" or "second" may explicitly or implicitly include one or more such features.

Figure 4:
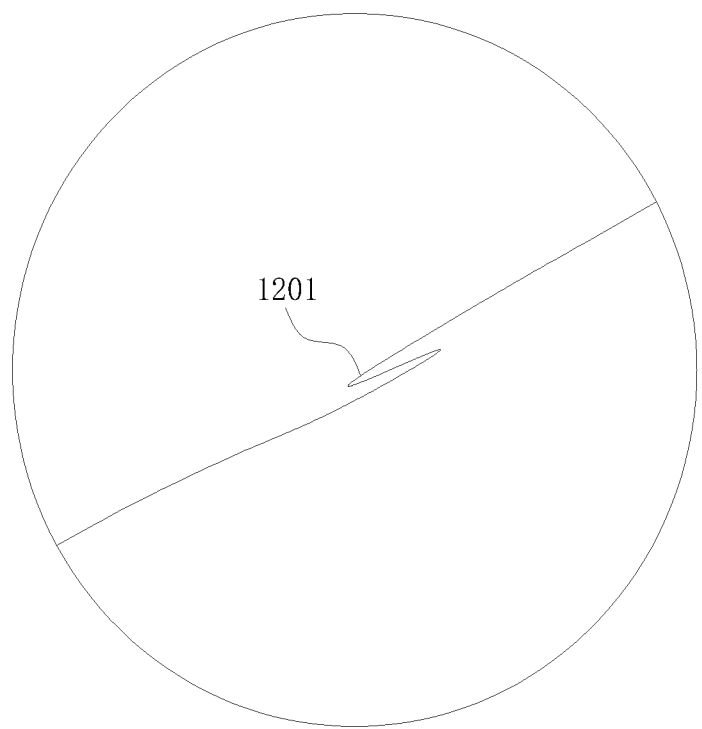
FIG. 4 is an enlarged view at A of FIG. 3.
Figure 5:
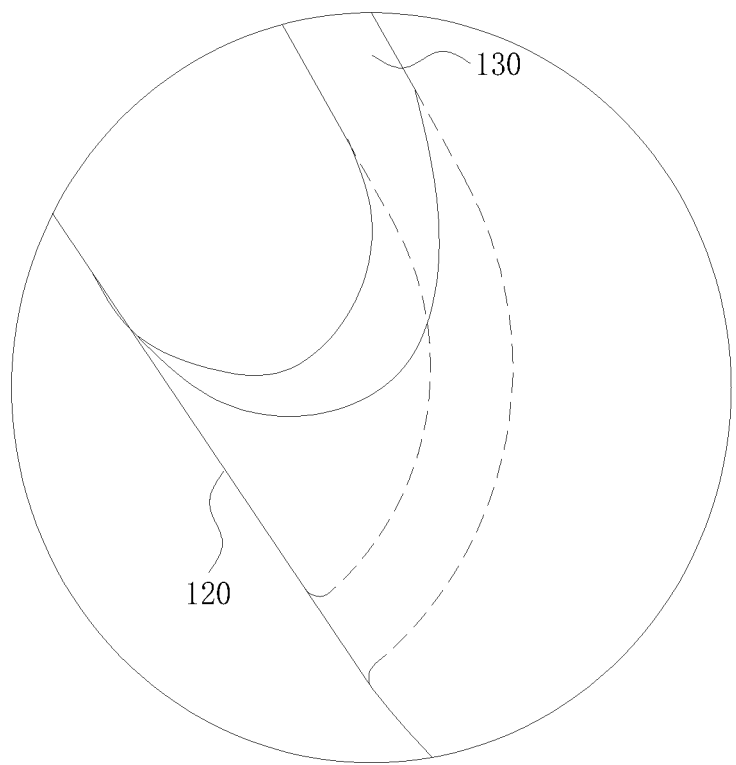
FIG. 5 is an enlarged view at B of FIG. 3.
Figure 6:
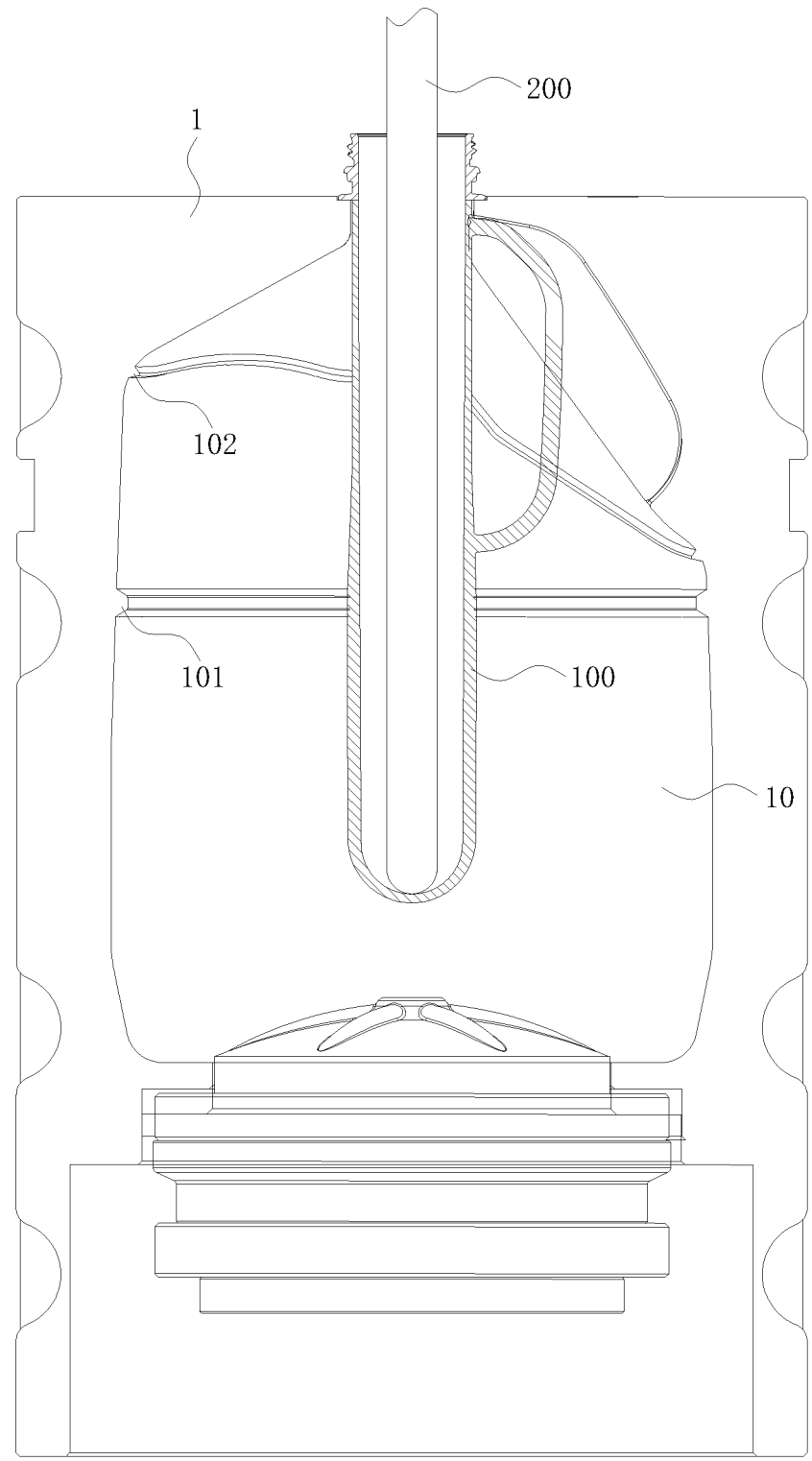
FIG. 6 is a schematic view before blowing a bottle preform with a self-contained handle by using a bottle blowing mold according to an embodiment of the present application.
Figure 7:
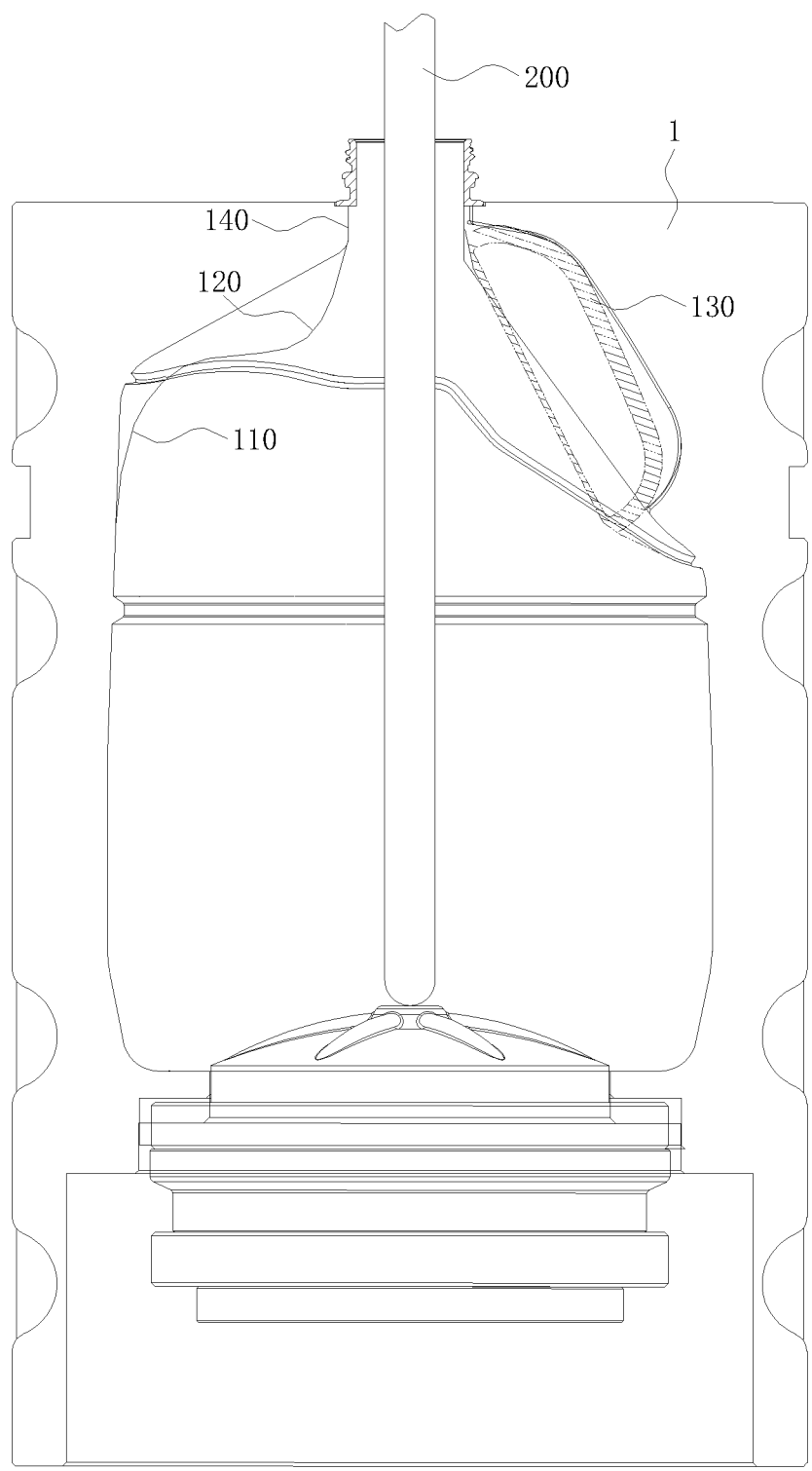
FIG. 7 is a schematic view of a process of blowing a bottle preform with a self-contained handle by using a bottle blowing mold according to an embodiment of the present application.
Figure 8:
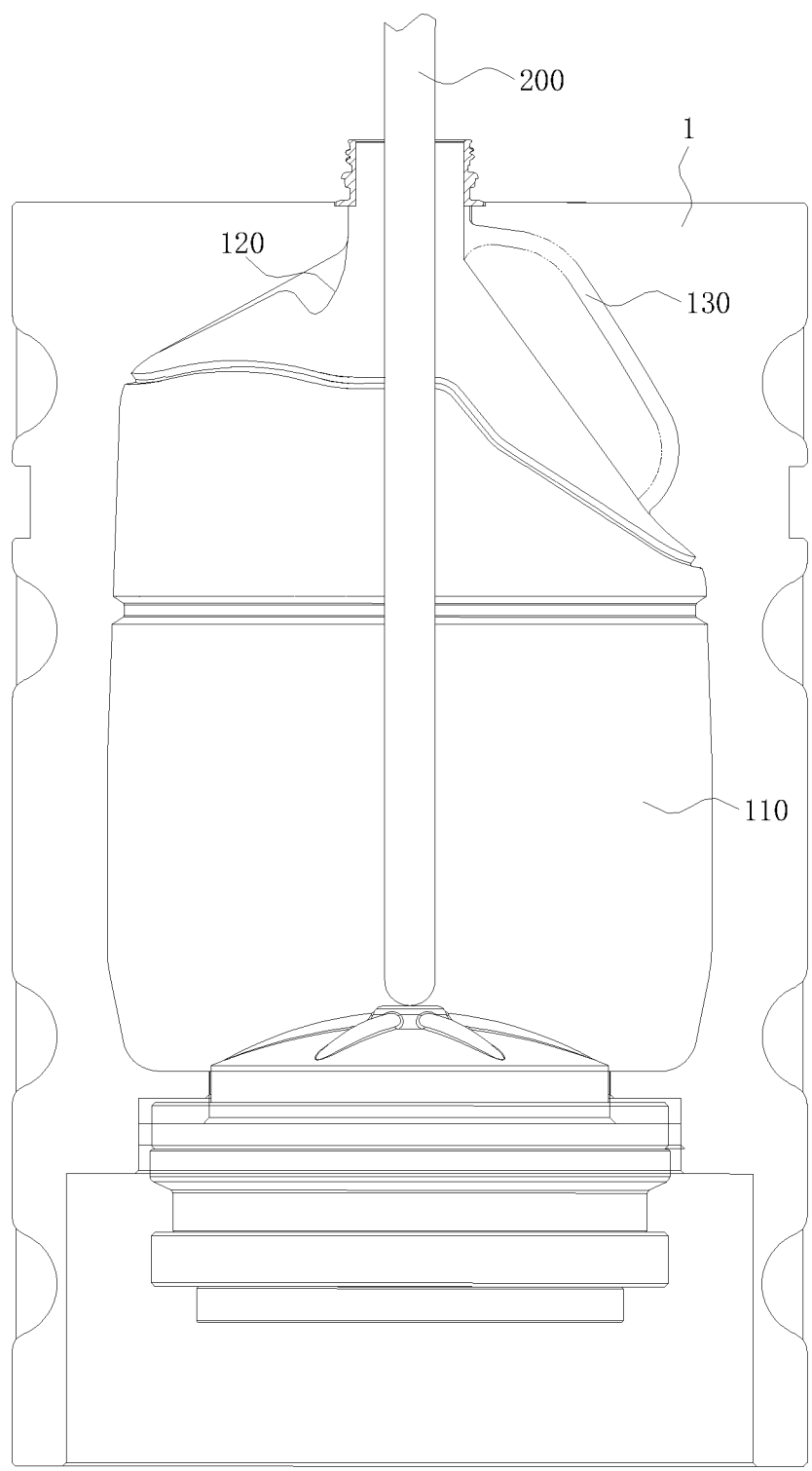
FIG. 8 is a schematic view when blowing a bottle preform with a self-contained handle by using a bottle blowing mold is nearly completed according to an embodiment of the present application.
Figure 9:
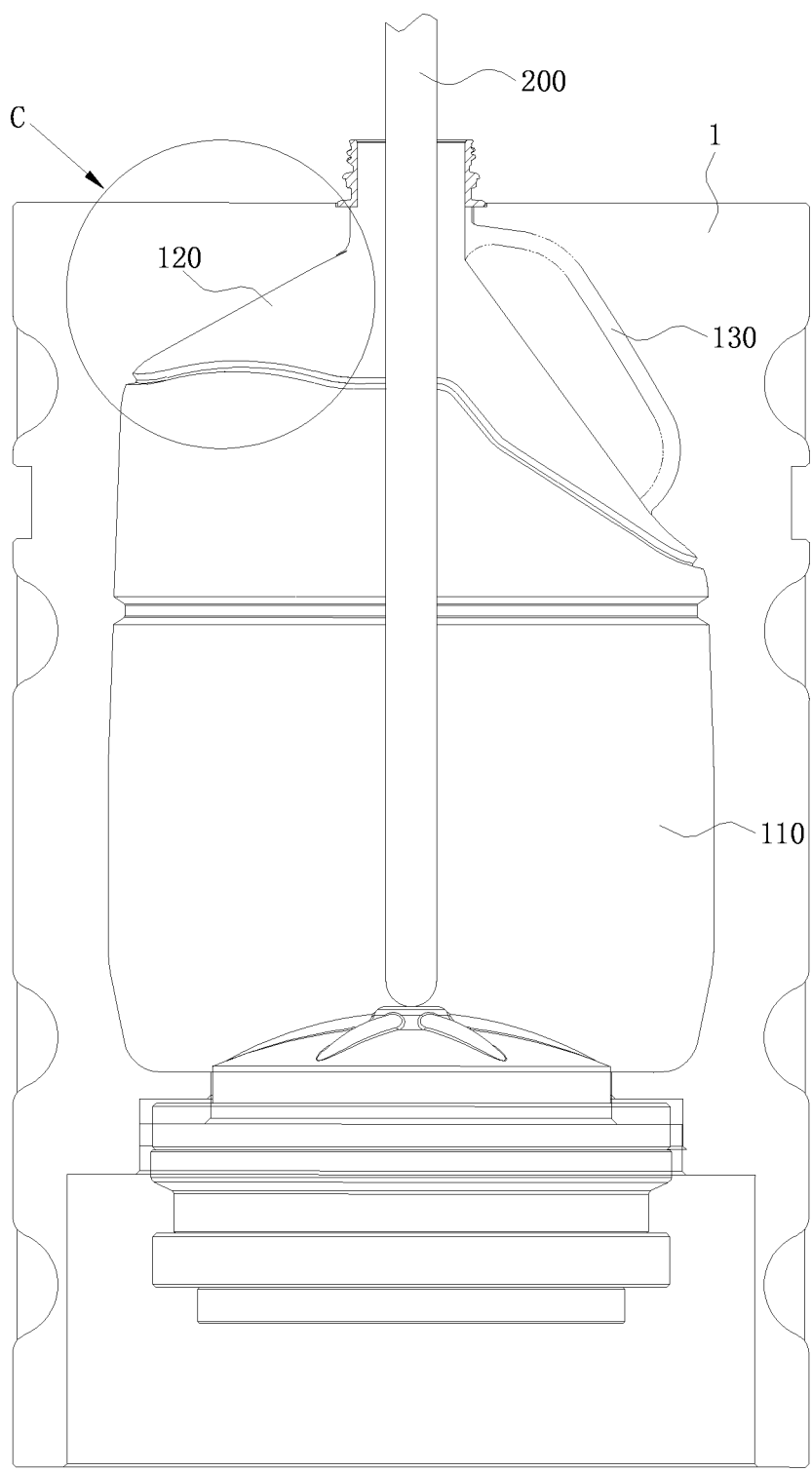
FIG. 9 is a schematic view after blowing a bottle preform with a self-contained handle by using a bottle blowing mold according to an embodiment of the present application.

According to a two-step bottle blowing process, a bottle preform 100 needs to be manufactured firstly, and then a specific mold is used for blowing the bottle preform 100, as shown in FIGS. 1 to 5. When a conventional mold 1' is used for blowing a bottle preform 100 with a self-contained handle 130, due to a fact that the handle 130 is additionally provided, in a stretching and expanding process of the bottle preform 100, a preform at the bottle body 110 part is expanded firstly and fills a lower portion of a mold cavity 10, and at this time, the handle 130 part of the bottle preform 100 is not attached to a cavity wall of the mold cavity 10, and along with blowing, a preform at the bottle body 110 part may push the handle 130 to the cavity wall of the mold cavity 10 under the action of compressed air, and finally the preform and the handle 130 are attached to the cavity wall of the mold cavity 10 together under the action of the compressed air, after a blowing is completed, a first wrinkle 1201 (as shown in FIG. 4) is prone to occurring on a bottle shoulder 120, a lower end of the handle 130 also deviates upwards, so that the handle 130 is deformed (as shown in FIG. 5, a dotted line shows a correct position of the lower end of the handle 130), whereby a quality defect is caused.

As shown in FIGS. 6 to 11, the bottle blowing mold 1 in the embodiment includes the mold cavity 10, and the bottle body 110, the bottle shoulder 120, the handle 130 and the bottle neck 140 are formed within the mold cavity 10 after the bottle preform 100 is blown, the bottle shoulder 120 is located between the bottle body 110 and the bottle neck 140, one end of the handle 130 is connected to the bottle shoulder 120, an other end of the handle 130 is connected to the bottle neck 140, and two ends of the handle 130 may also be connected to the bottle shoulder 120. The cavity wall of the mold cavity 10 is provided with at least one first rib 101 to have a non-closed or annularly closed first groove 1100 formed on the bottle body 110.

According to the bottle blowing mold 1 of this embodiment, the cavity wall of the mold cavity 10 is provided with at least one first rib 101 to have the non-closed or annularly-closed first groove 1100 formed on the bottle body 110, the first rib 101 limits the preform at the bottle body 110 part from moving towards the bottle shoulder 120 and the handle 130 in the blowing process, the first wrinkle 1201 is prevented from being generated at the bottle shoulder 120, deformation of the handle 130 is avoided, and the blowing quality of the bottle preform 100 is improved. The first rib 101 is optionally disposed near the bottle shoulder 120 so as to obtain a better effect of limiting the movement of the preform. Moreover, the first groove 1100 also plays a role in enhancing the structural strength of the bottle body 110, and multiple first grooves 1100 may be obtained by providing multiple first ribs 101, so that the structural strength of the bottle body 110 is greatly improved, and thus the bottle body 110 is not easy to deform.

Optionally, the cavity wall of the mold cavity 102 is further provided with a second rib 10 to have a second groove 1200 formed at a junction of the bottle shoulder 120 and the bottle body 110. The second rib 102 also has the effect of limiting the preform at the bottle body 110 part from moving towards the bottle shoulder 120 and the handle 130 in the blowing process, so that the blowing quality of the bottle preform 100 may be improved.

Figure 12:
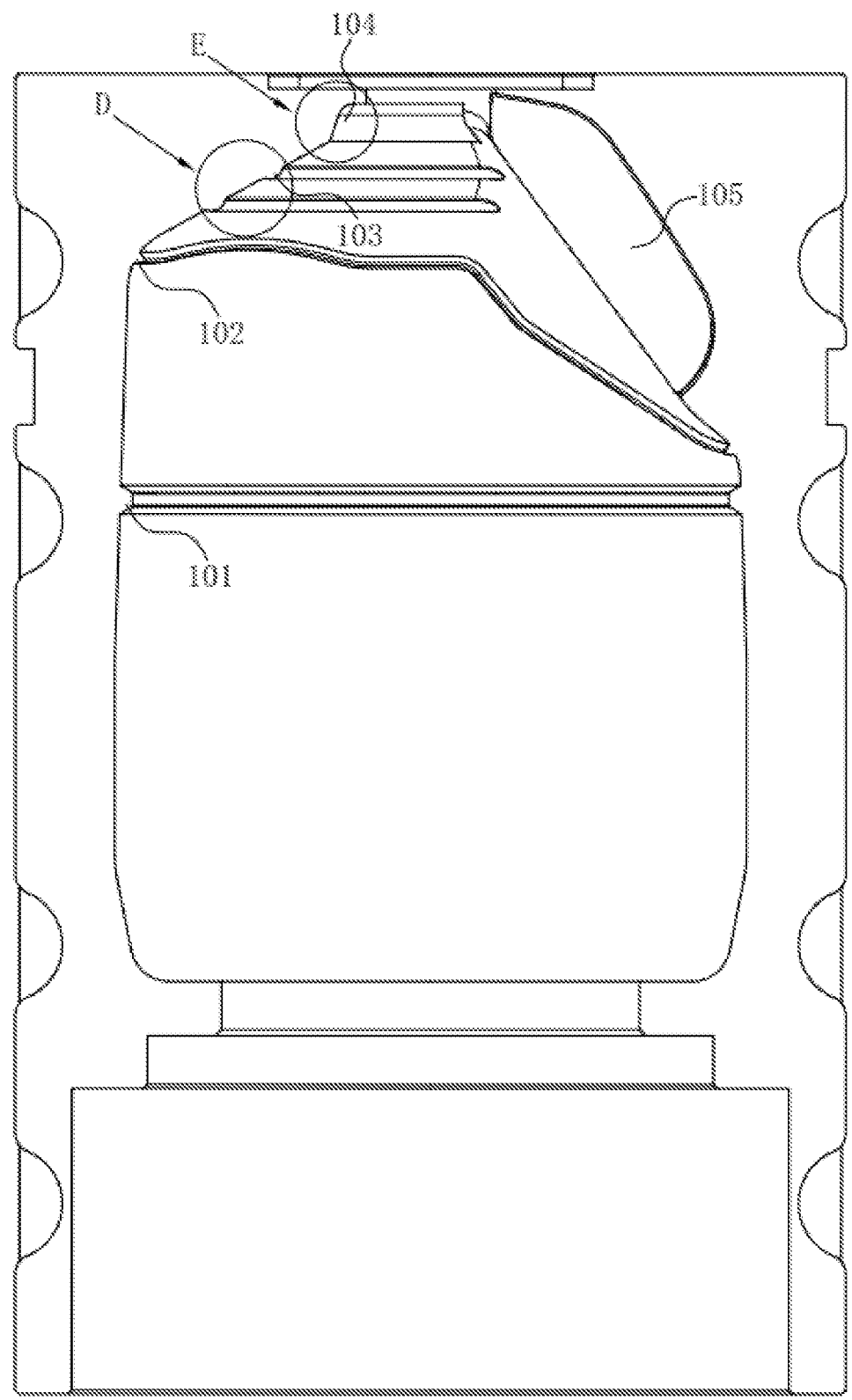
FIG. 12 is a schematic structural view of a mold cavity of a bottle blowing mold according to another embodiment of the present application.
Figure 13:
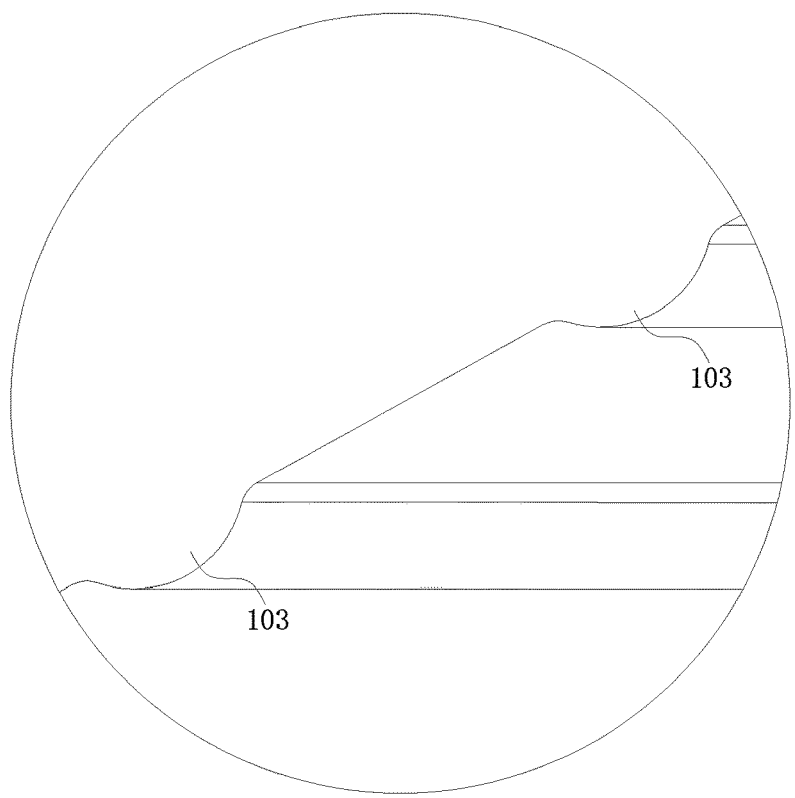
FIG. 13 is an enlarged view at D of FIG. 12.
Figure 16:
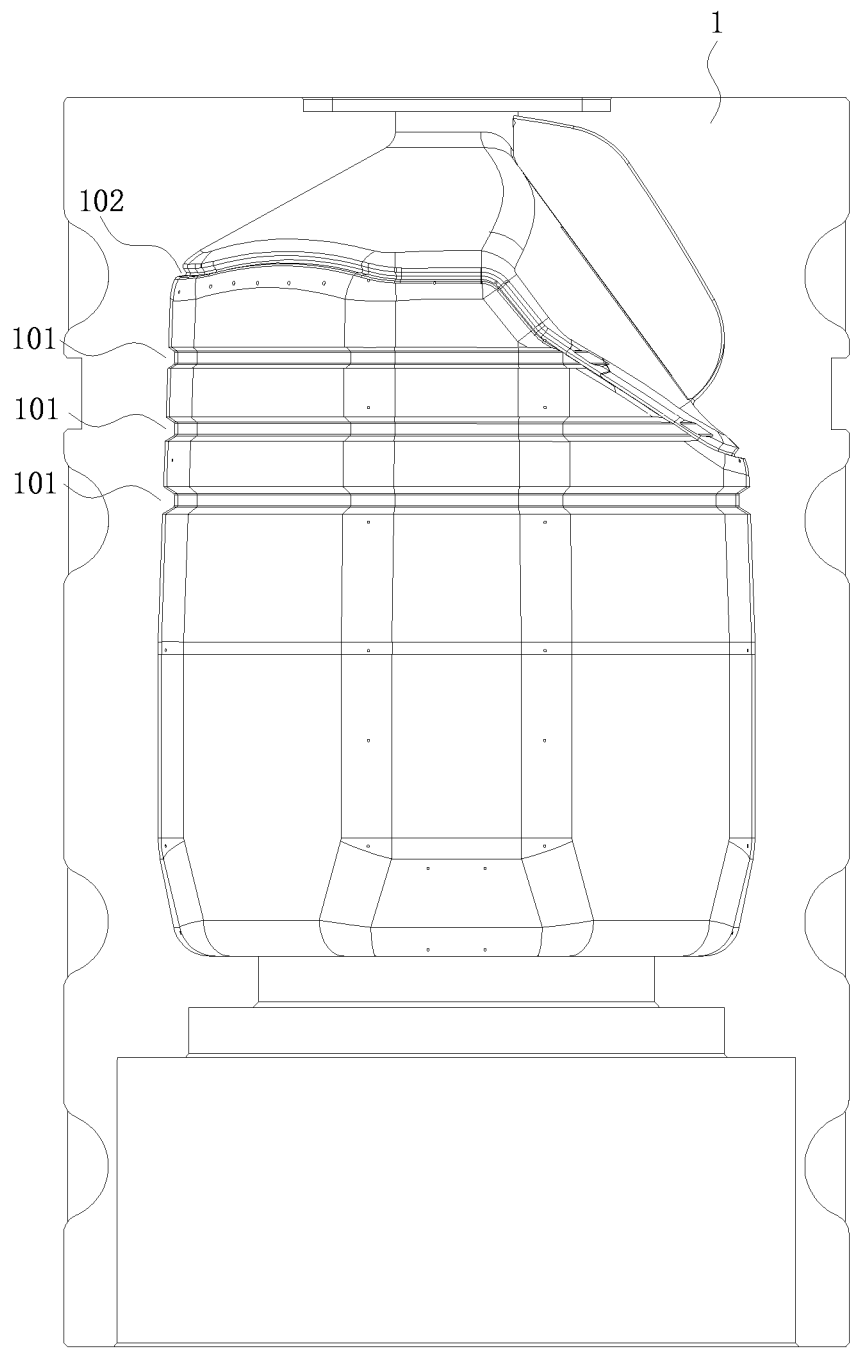
FIG. 16 is a schematic structural view of a mold cavity of a bottle blowing mold according to still another embodiment of the present application.
Figure 17:
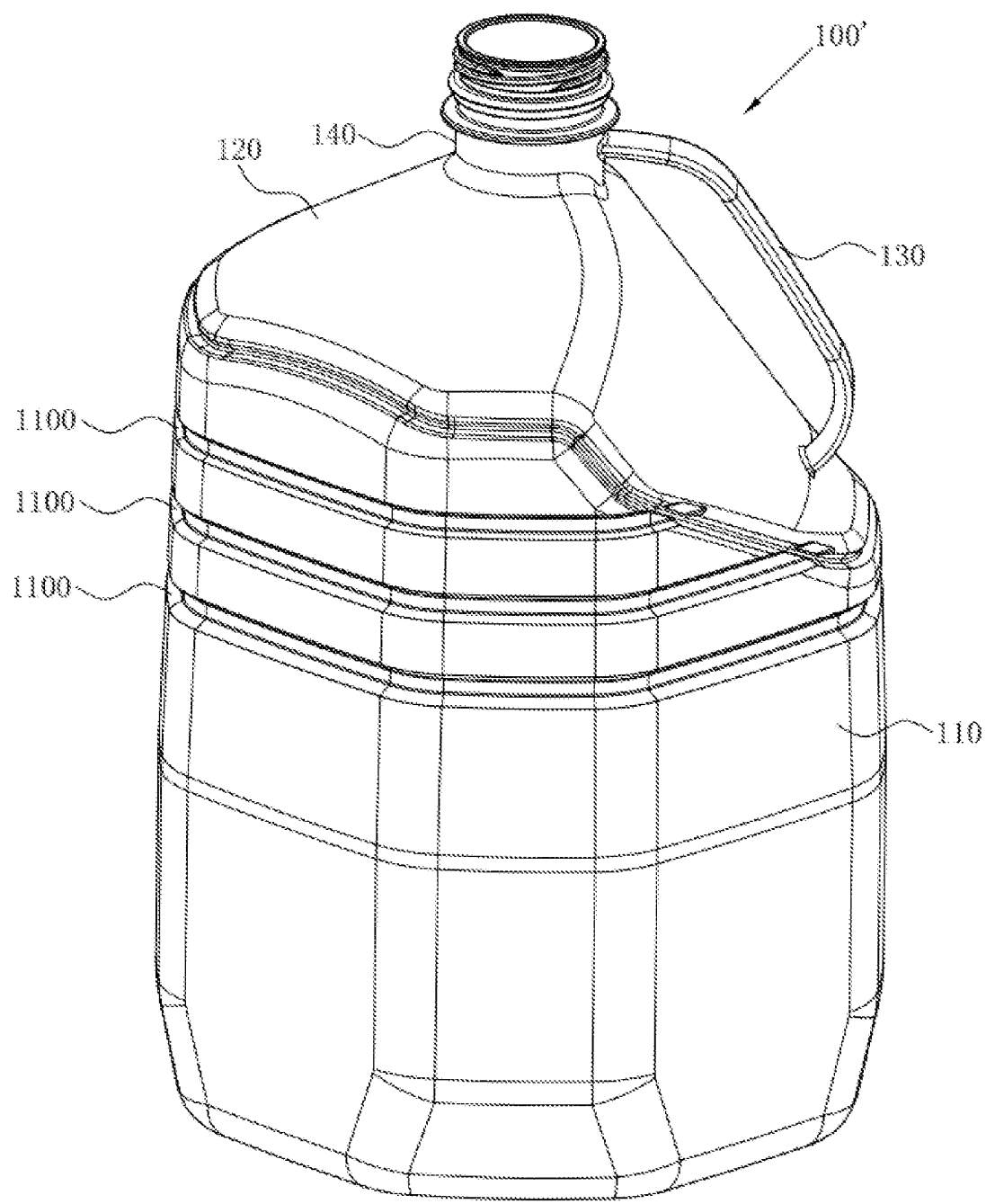
FIG. 17 is a schematic perspective view of a plastic bottle blown by using the bottle blowing mold shown in FIG. 16.
Figure 18:
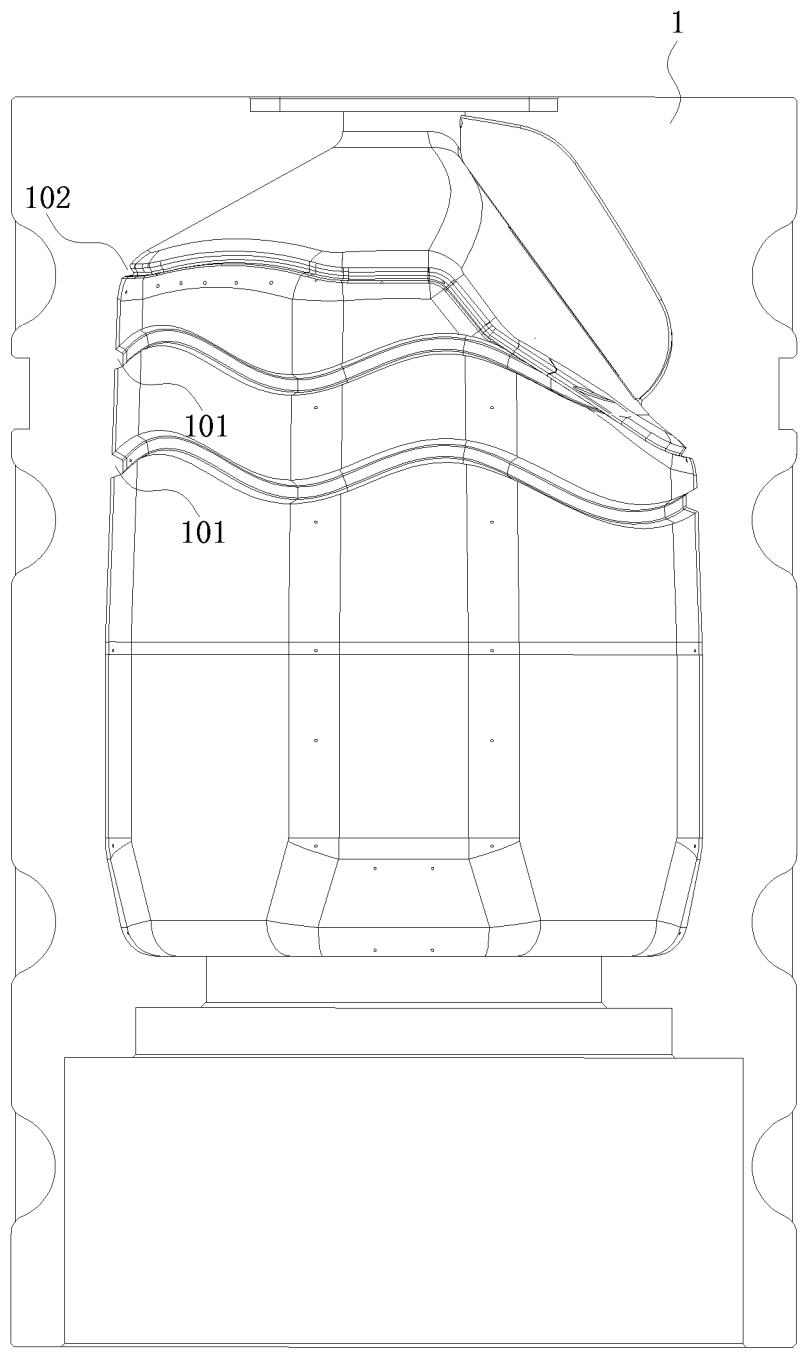
FIG. 18 is a schematic structural view of a mold cavity of a bottle blowing mold according to yet another embodiment of the present application.
Figure 19:
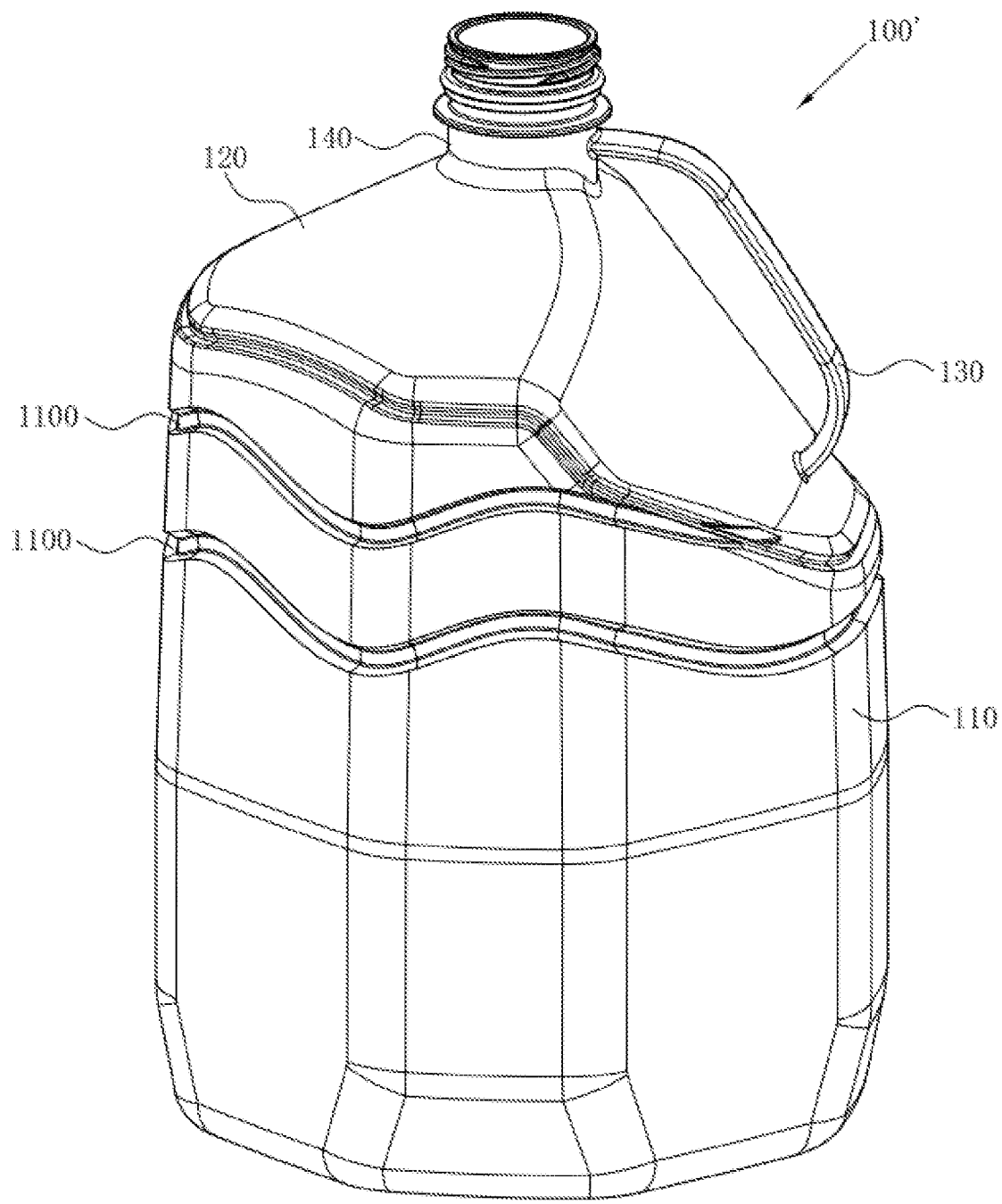
FIG. 19 is a schematic perspective view of a plastic bottle blown by using the bottle blowing mold shown in FIG. 18.

Exemplarily, the first ribs 101 are disposed on a same plane or the first ribs 101 are disposed on the cavity wall in a wave shape, and a specific shape of the first rib 101 may be flexibly selected according to actual needs. As shown in FIG. 12 and FIG. 16, the first rib 101 has a closed ring shape or a non-closed arc shape, and the first ribs 101 are disposed on a same plane so that a height of the first groove 1100 is the same everywhere. As shown in FIGS. 18 and 19, the first ribs 101 exhibit a wave shape, so that the first groove 1100 also exhibits a wave shape, and the first grooves 1100 are not at a same height throughout.

Figure 20:
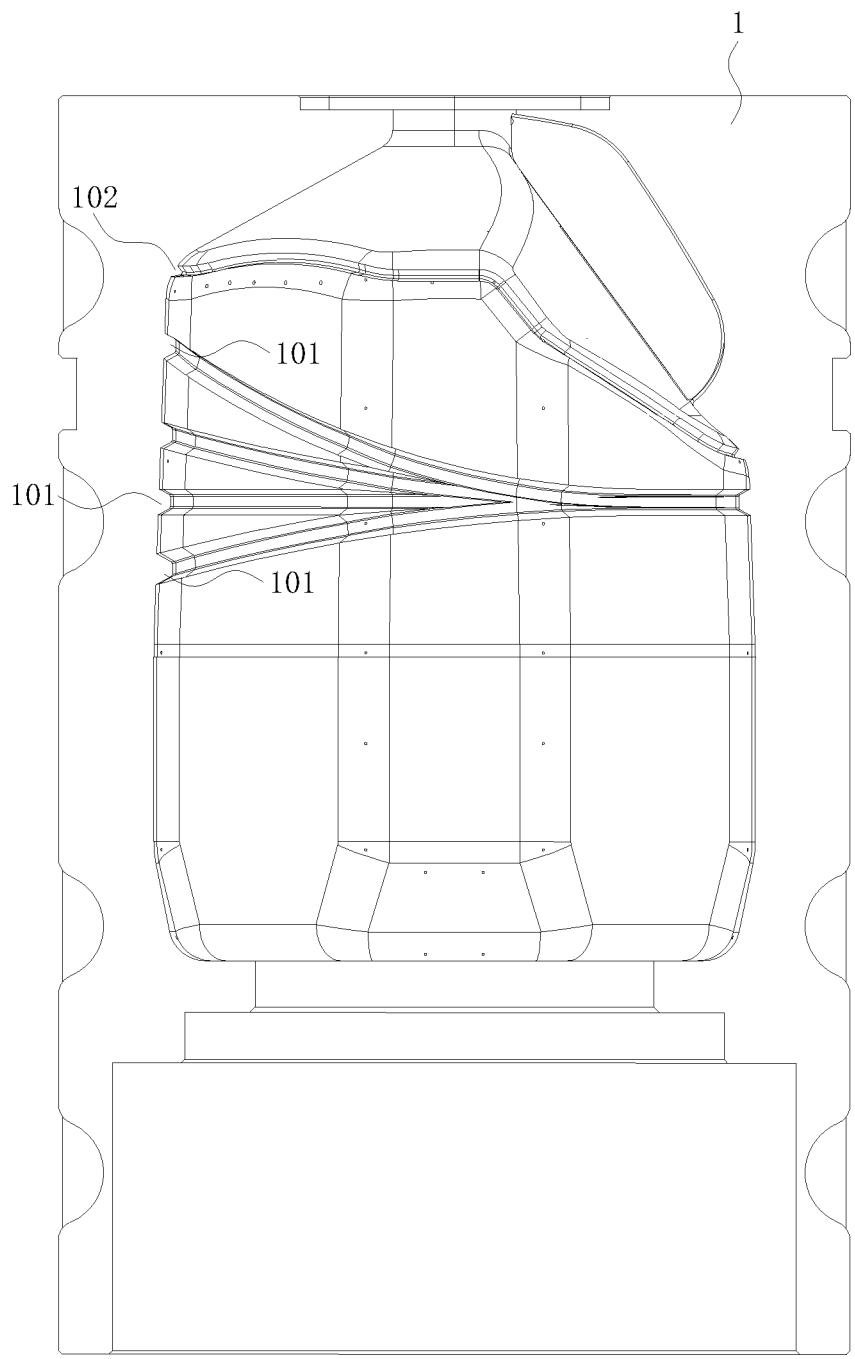
FIG. 20 is a schematic structural view of a mold cavity of a bottle blowing mold according to other embodiments of the present application.
Figure 21:
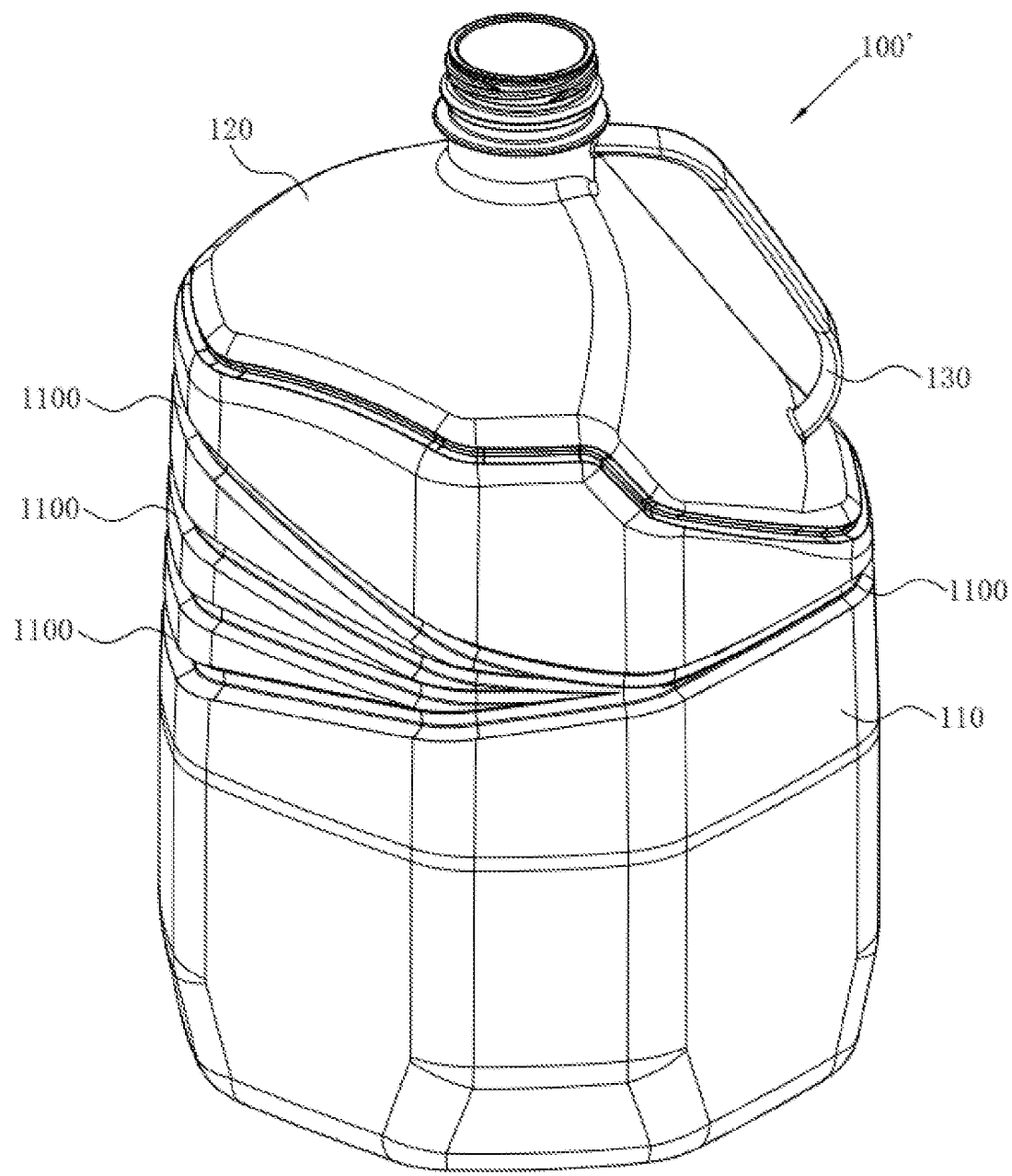
FIG. 21 is a schematic perspective view of a plastic bottle blown by using the bottle blowing mold shown in FIG. 20.

When a number of the first ribs 101 is larger than two, the first ribs 101 may be disposed at intervals or may be partially connected together. As shown in FIGS. 20 and 21, the first ribs 101 are partially connected, so that a part of the first grooves 1100 is overlapped.

Figure 10:
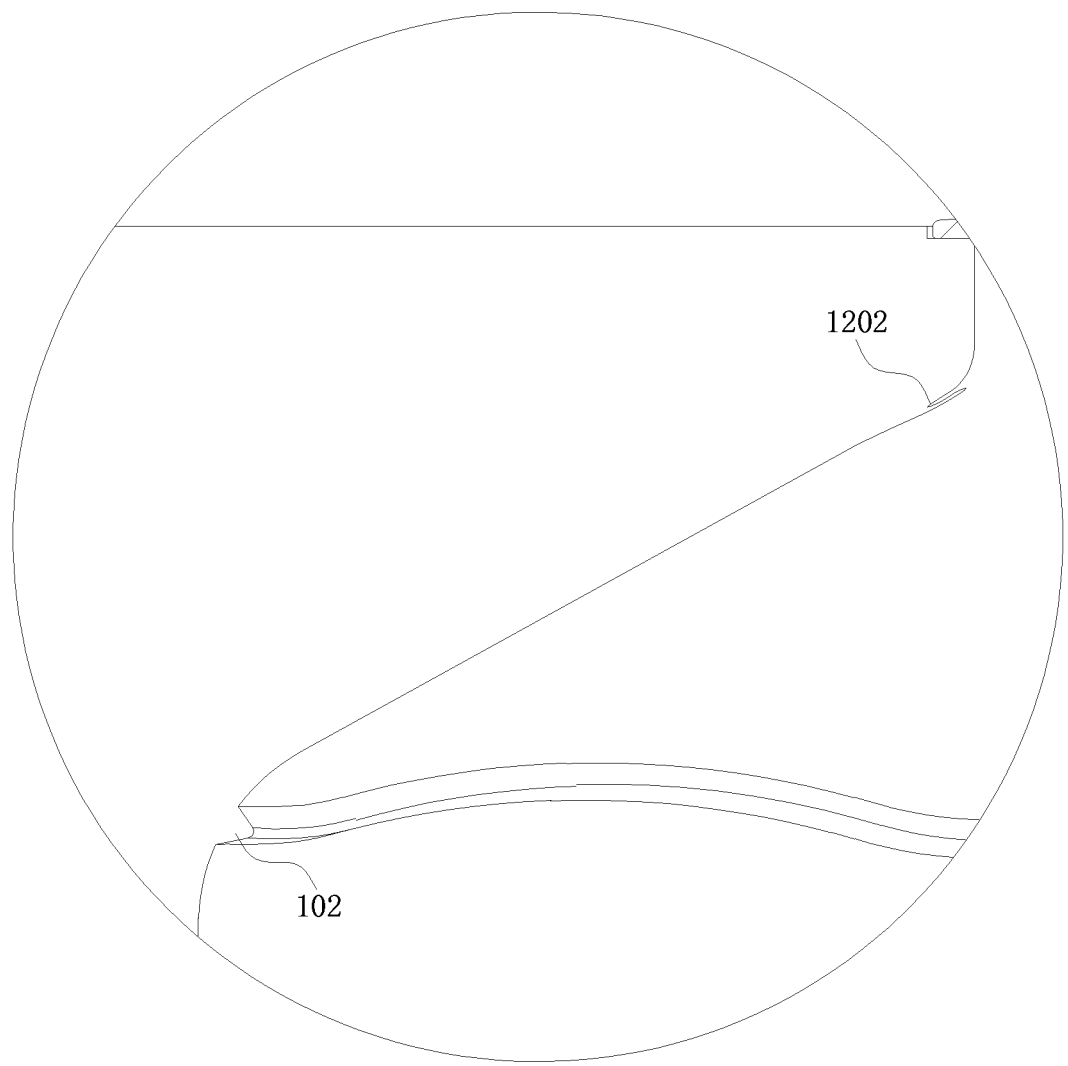
FIG. 10 is an enlarged view at C of FIG. 9.
Figure 11:
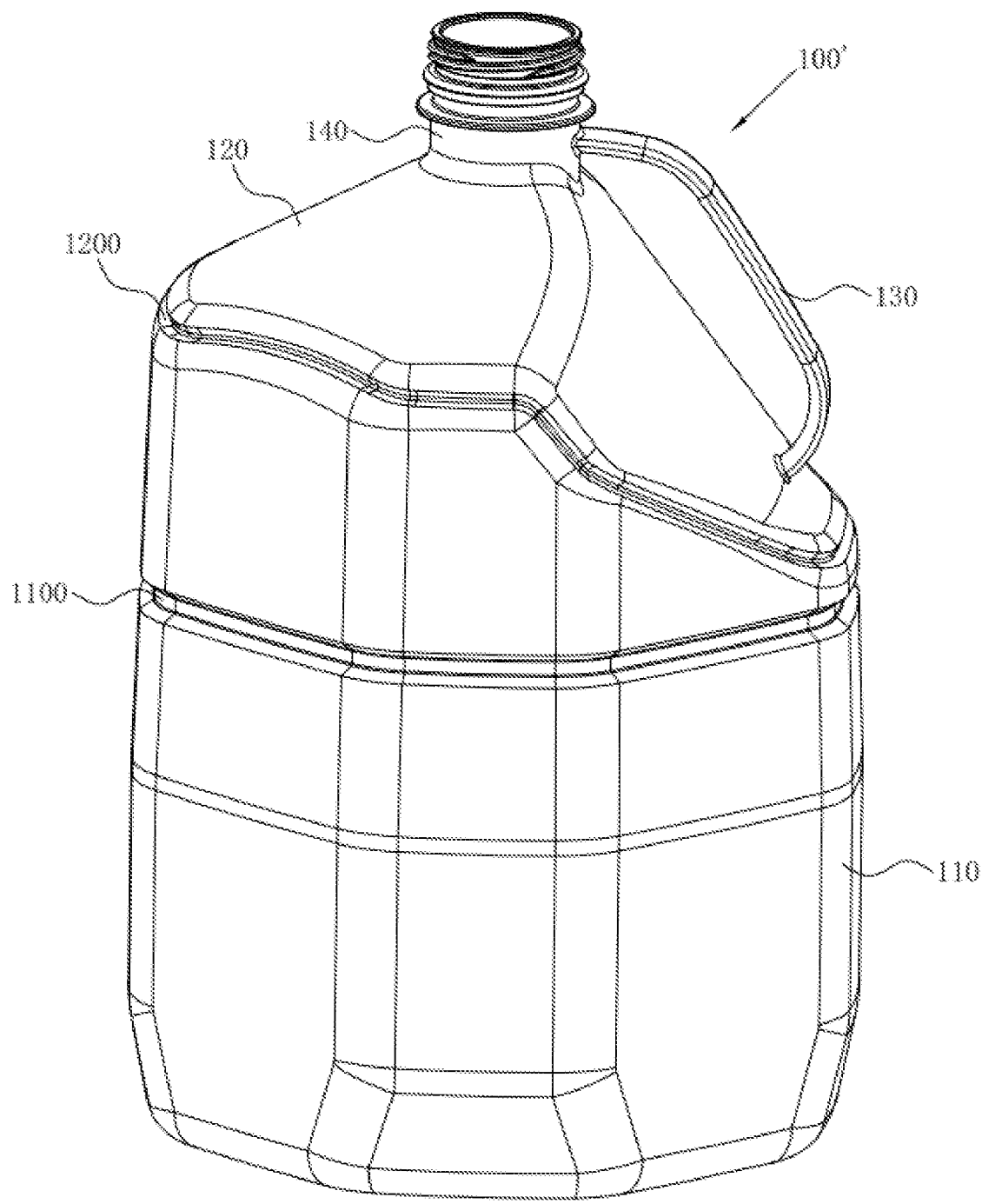
FIG. 11 is a schematic perspective view of a plastic bottle according to an embodiment of the present application.

As shown in FIGS. 12 to 15, optionally, the cavity wall of the mold cavity 10 is further provided with at least one third rib 103 to have a non-closed third groove 1300 formed on the bottle shoulder 120. FIGS. 6 to 9 show a process in which the bottle preform 100 is blown in an embodiment, as shown in FIG. 10, and after the blowing is completed, a second wrinkle 1202 is easily formed at a connection of the bottle shoulder 120 and the bottle neck 140. A third groove 1300 may be formed on the bottle shoulder 120 by disposing the third rib 103, the third rib 103 limits the preform of the bottle shoulder 120 from moving towards the bottle neck 140 in the blowing process, and the second wrinkle 1202 is prevented from being generated at the connection of the bottle shoulder 120 and the bottle neck 140.

Figure 14:
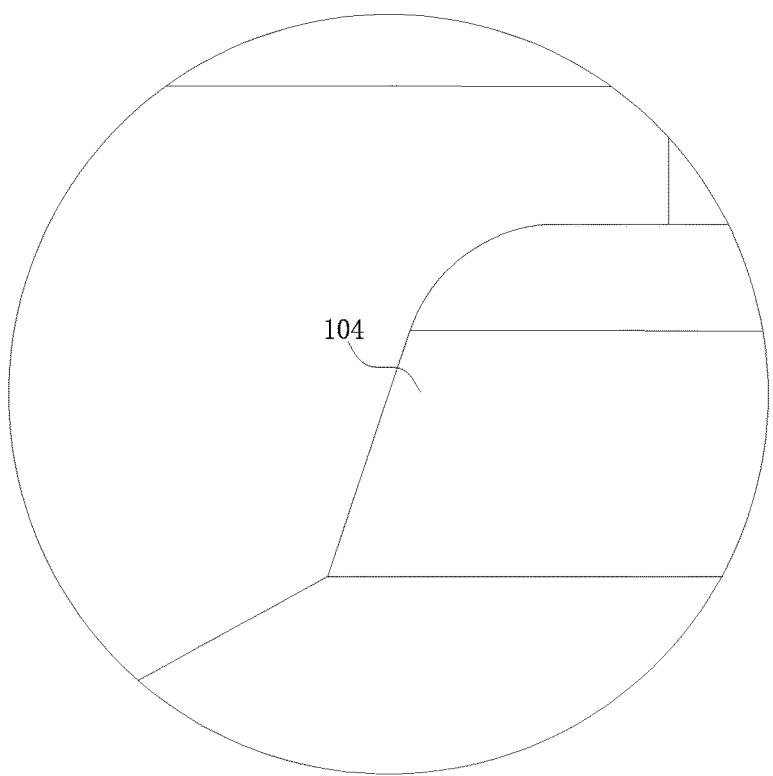
FIG. 14 is an enlarged view at E of FIG. 12.
Figure 15:
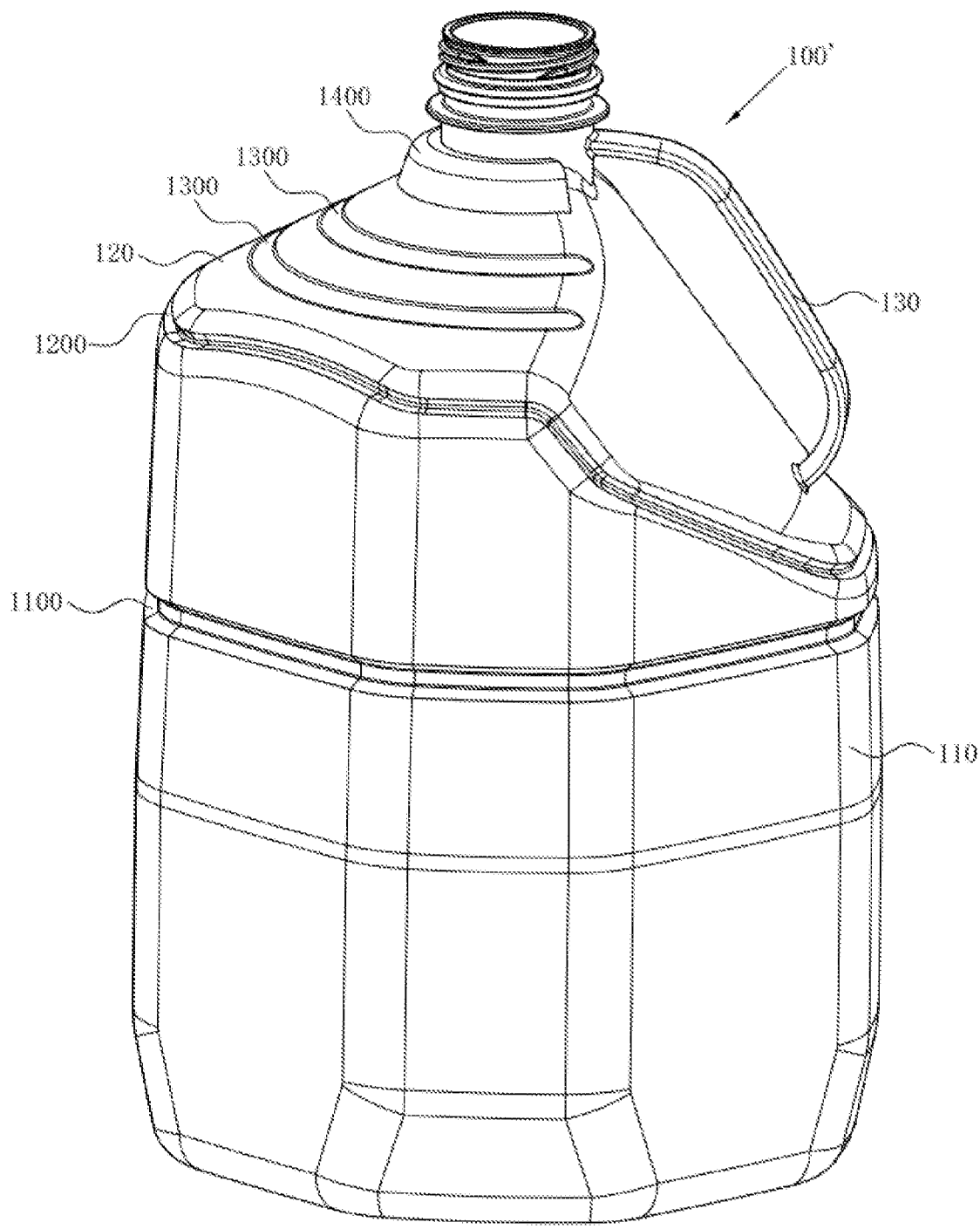
FIG. 15 is a schematic perspective view of a plastic bottle blown by using the bottle blowing mold shown in FIG. 12.

As shown in FIGS. 12, 14, and 15, optionally, the mold cavity 10 includes a first concave region 104 have a raised step structure 1400 formed on the bottle neck 140. The step structure 1400 allows more preforms to be accommodated at the bottle neck 140, whereby the second pleat 1202 is prevented from being generated at the connection of the bottle shoulder 120 and the bottle neck 140.

As shown in FIG. 15, optionally, the mold cavity 10 includes a second concave region 105 configured for accommodating the handle 130. A shape of the second concave region 105 matches a shape of the handle 130 so that the handle 130 may be stopped in a correct position during the blowing process of the bottle preform 100.

Figure 22:
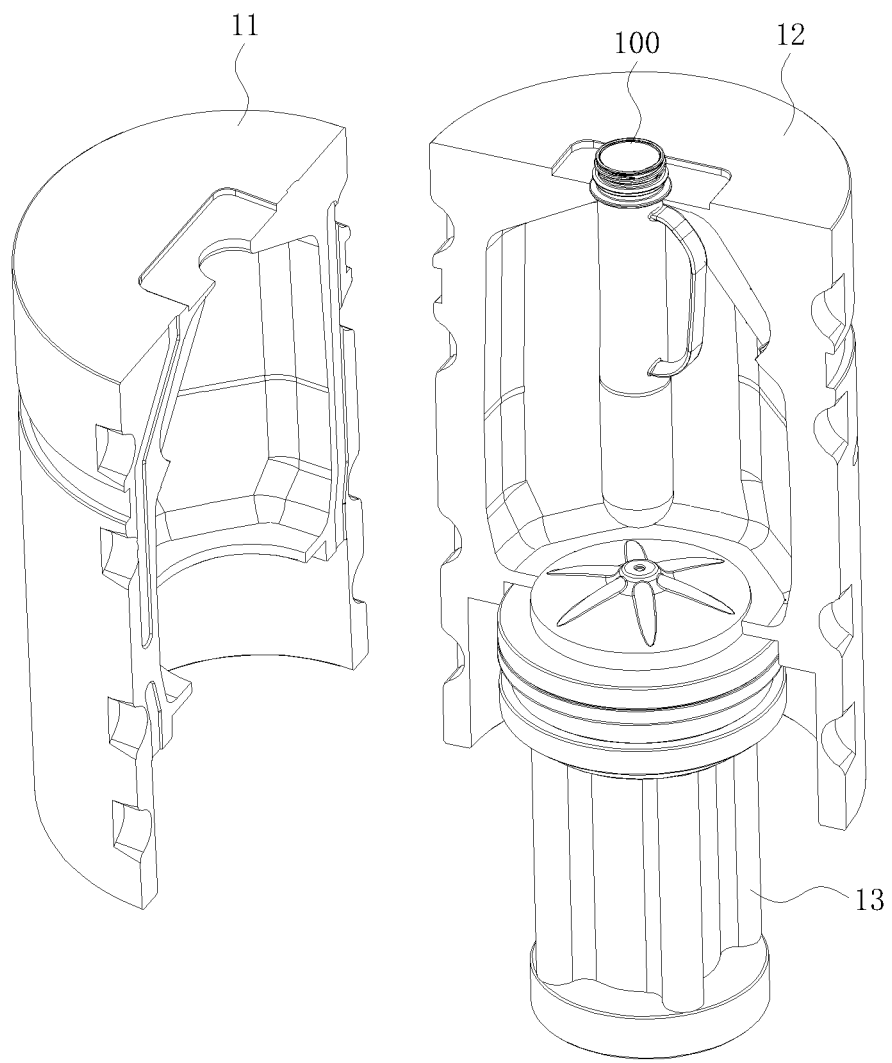
FIG. 22 is a schematic perspective view of a bottle blowing mold according to an embodiment of the present application.

Optionally, as shown in FIG. 22, the bottle blowing mold 1 includes a left half mold 11, a right half mold 12 and a bottom mold 13, where the left half mold 11, the right half mold 12 and the bottom mold 13 are assembled to form the mold cavity 10. In combination with FIGS. 6 to 9, the bottle preform 100 is blown in the following steps: firstly, the left half mold 11 is separated from the right half mold 12, then the heated bottle preform 100 is placed between the left half mold 11 and the right half mold 12, the left half mold 11, the right half mold 12 and the bottom mold 13 are closed, and a stretching rod 200 is inserted into the bottle preform 100 from a preform opening to longitudinally stretch the bottle preform 100, and meanwhile, compressed air is blown into the bottle preform 100 from the preform opening to transversely stretch the bottle preform 100, and after the bottle preform 100 is blown, the bottle blowing mold 1 is opened.

An embodiment of the present application further provides a bottle blowing machine, the bottle blowing machine includes the bottle blowing mold 1 of any one of the embodiments described above, so that the bottle blowing machine may perform the high-quality blowing on the bottle preform 100 with a self-contained handle 130.

As shown in FIG. 11, FIG. 15, FIG. 17, FIG. 19 and FIG. 21, an embodiment of the present disclosure further provides a plastic bottle 100', the plastic bottle 100' is made by the bottle blowing machine described above, the plastic bottle 100' has a self-contained handle 130, instead of being in the form of an independent handle which is additionally installed after blowing, whereby the production process is simplified, the production cost is reduced, and a problem that the independent handle falls off is not worried.

Optionally, the plastic bottle 100' is made of PET, so that the plastic bottle 100' has the advantages of being good in sealing performance, firm in bottle body, high in oxygen barrier performance, transparent, easy to observe and the like.

As a preferred implementation of the present application, in the description of this specification, a description referring to the term "preferred" and the like means that a specific feature, structure, material, or characteristic described in conjunction with the embodiment or example is included in at least one embodiment or example of the present application. In the present specification, schematic recitations of the above terms do not necessarily refer to the same embodiment or example. Moreover, the specific features, structures, materials, or characteristics described may be combined in a suitable manner in any one or more embodiments or examples.

What is claimed is:

1. A bottle blowing mold applied in a bottle preform with a self-contained handle, comprising a mold cavity, wherein a bottle body, a bottle shoulder, a handle and a bottle neck are formed within the mold cavity after a bottle preform is blown, the bottle shoulder is located between the bottle body and the bottle neck, one end of the handle is connected to the bottle shoulder, and an other end of the handle is connected to the bottle shoulder or the bottle neck, a cavity wall of the mold cavity is provided with at least one first rib to have a non-closed first groove or an annularly closed first groove formed on the bottle body.

2. The bottle blowing mold of claim 1, wherein the cavity wall is further provided with a second rib to have a second groove formed at a junction of the bottle shoulder and the bottle body.

3. The bottle blowing mold of claim 1, wherein the at least one first rib is disposed on a same plane, or the at least one first rib is disposed on the cavity wall in a wave shape.

4. The bottle blowing mold of claim 1, wherein a number of first ribs is not less than two, and the first ribs are disposed at intervals or partially connected.

5. The bottle blowing mold of claim 1, wherein the cavity wall is further provided with at least one third rib to have a non-closed third groove formed on the bottle shoulder.

6. The bottle blowing mold of claim 1, wherein the mold cavity comprises a first concave region to have a raised step structure formed on the bottle neck.

7. The bottle blowing mold of claim 1, wherein the mold cavity comprises a second concave region configured for accommodating the handle.

* * * * *